July 25, 1950  E. M. PURCELL  2,516,528
WAVE GUIDE COUPLER
Filed March 21, 1944
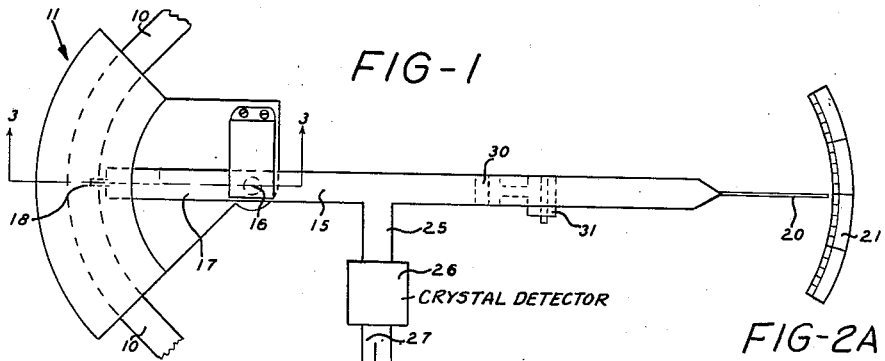
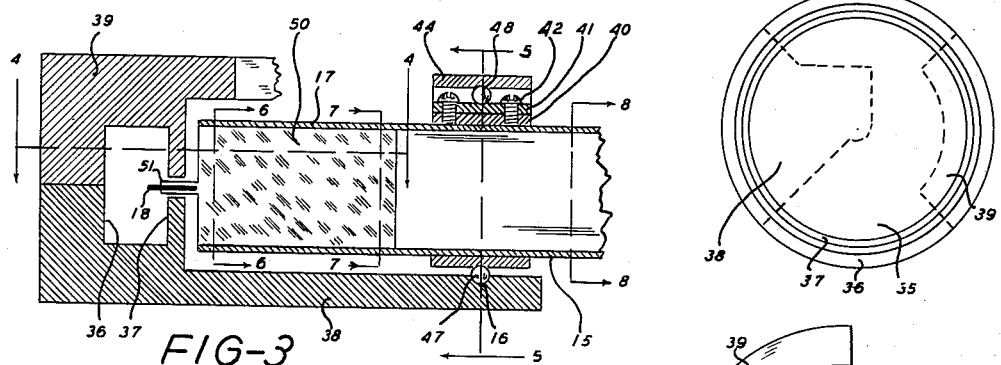
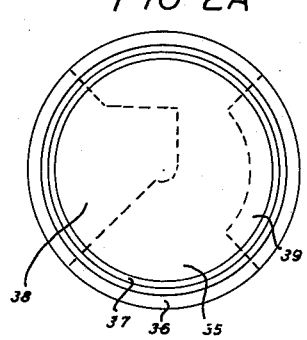
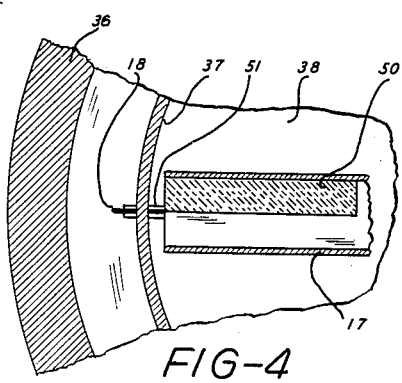
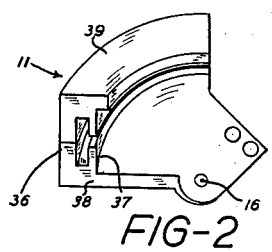
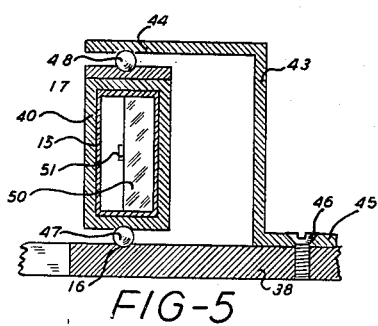
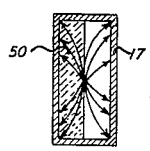
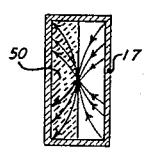
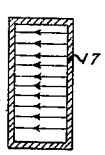
INVENTOR.
EDWARD M PURCELL
BY
William D. Hall.
Attorney Patented July 25, 1950

2,516,528

UNITED STATES PATENT OFFICE 2,516,528

WAVE GUIDE COUPLER

Edward M. Purcell, Cambridge, Mass., assignor, by mesne assignments, to the United States of America as represented by the Secretary of War Application March 21, 1944, Serial No. 527,426

3 Claims. (Cl. 178—44)

This invention relates to a detector adapted to determine standing high frequency wave ratios in hollow wave guides.

In a test device of this character, a detector probe is movably disposed within a wave carrying guide, and electric intensity values are determined at various points along the guide. The principal object of the invention, therefore, is to provide means for moving a test probe in the guide through small but measurable distances in such a manner as to avoid error causing backlash and undesired relative motion of the detector parts with respect to the guide.

To accomplish this object, a test probe is rigidly carried by an associated pickup wave guide which is pivotally mounted with respect to the wave carrying guide. A circular curve is provided in the latter guide, and the probe carrying pickup guide is pivoted at the center of curvature, so that the probe may be moved axially within the arcuate guide, the pivoted structure thus being maintained in unvarying radial relation with the guide. The probe, which extends into the arcuate guide through a slot therein, is carried by the shorter of two arms comprising the pickup guide, the other and longer arm being arranged to move over a calibrated scale. Thus the longer arm may be moved a suitable distance measured on the scale, and the probe will be moved along the guide interior a smaller distance, the two distances being related by the ratio of arm lengths.

The invention also discloses a novel method for constructing the above-mentioned circular bend applied to the rectangular wave guide.

In the drawing, Fig. 1 is a plane view of the detector structure; Figs. 2 and 2A illustrate the method for constructing the circular bend; Fig. 3 is a sectional view on the line 3—3 of Fig. 1; Fig. 4 is a sectional view on the line 4—4 of Fig. 3; Fig. 5 is a sectional view on the line 5—5 of Fig. 3; and Figs. 6, 7, and 8 are sectional views on the lines 6—6, 7—7 and 8—8, respectively, of Fig. 3, showing the electric vectors at various points in the pickup wave guide.

Referring to Fig. 1 of the drawing, a rectangular wave guide is indicated by 10. Guide 10, constructed in the usual manner and with the usual ratio of longer, or wider, to shorter, or narrower, sides, extends between a suitable generator and load (not shown). An arcuate structure, indicated generally by 11, provides a circular bend in guide 10 and may be constructed in a manner hereinafter set forth.

A pickup wave guide 15, having the same sectional dimensions as guide 10, is pivotally mounted for angular rotation at the center of curvature 16 of arcuate structure 11. Guide 15 is divided by the pivot point into two arms of unequal length. The shorter arm 17 extends into operable relationship with curved structure 11 and terminates just short of the wave guide. A metallic test probe 18 extends from the free end of arm 17 into the curved section of wave guide 10 (best shown in Fig. 3). The other and longer arm of pickup guide 15 terminates in an adjusting pointer 20 arranged to move over a calibrated scale 21. Thus pointer 20 may be moved a predetermined distance, measured on scale 21, and test probe 18, carried by the opposite end of guide 15, will be moved a proportionate distance along guide 10. If desired, scale 21 may be calibrated to read directly the distance moved by the probe.

A section of rectangular wave guide 25 extends at right angles from the longer arm to a detector 26, which may be the usual crystal type detector. Leads 27 connect to a suitable meter (not shown) for indicating the intensity of detected energy. In order to properly match the impedance of detector 26, a shorting plunger 30 is disposed within the longer arm of guide 15. Plunger 30 movable along the guide interior to vary guide length, is fixed in proper position by an associated thumb screw 31.

Figs. 2 and 2A illustrate a suggested method for constructing the circular bend 11 for use with the invention. A metal disc 35 is turned to provide annular flanges 36 and 37 (best shown in Fig. 2). Prepared disc 35 is then cut in accordance with the dotted lines (Fig. 2A) so as to provide segments 38 and 39. Segment 39 is inverted upon segment 38, as shown, and the two parts are fixed together. Thus, perfect symmetry is maintained for all parts about the center of curvature 16. It will be noted that flange 37 is slightly shorter than flange 36 so that a narrow space exists between opposing flanges 37 when the two segments are fixed together. Test probe 18 extends into the wave guide through this narrow space thus provided in a longer guide side.

Referring now to Fig. 3, pickup wave guide 15 is pivotally mounted at the center of curvature 16 of disc segment 38. A rectangular collar 40 slidably receives guide 15 and supports said guide at the pivot point. A bearing plate 41 is fixed to the top of collar 40 by screws 42. The degree of coupling between pickup guide 15 and guide 10 is determined by the distance that probe 18 is inserted into guide 10. The coupling may be varied by sliding guide 15 in collar 40. After guide 15 is adjustably positioned in collar 40 for proper coupling, screws 42 lock it in place. Thus, guide 15 is longitudinally slidable with respect to the pivot point so that test probe 18 mounted at the guide end may be pre-set at different radial positions within test guide 10. A fixed supporting member 43 (Fig. 5) is rigidly associated with plate 38 at a point away from the center of curvature, a portion 44 thereof extending above the plate and over the center of curvature. Member 43 is secured to the plate by flange 45 and screws 46. Plate 38, collar 40, bearing plate 41 and fixed portion 44 have appropriate collinear recesses to receive and retain ball bearings 47 and 48, which pivotally support wave guide 15 at the center of curvature 16 of the arcuate guide.

In order to provide electromagnetic coupling between pickup guide 15 and guide 10, insulation 50 is disposed in the end of guide 15 adjacent curved structure 11. Insulation 50, which may be polystyrene, is rectangular in cross section, the long dimension thereof being equal to the long sectional dimension of the wave guide, and its shorter dimension being one-half the short dimension of the guide. Probe 18 is embedded in a reduced section 51 of the insulation which extends through the space provided in the arcuate guide side. The length of block 50 is such that a 180° phase difference must be produced at the end. While this particular method of coupling is preferred, other equivalent coupling means may be used, if desired.

The manner in which insulation 50 cooperates to cause proper excitation of guide 15 is shown in Figs. 6, 7, and 8. Fig. 6 shows the wave mode at the probe end of the insulation. Traveling waves at this point will see effectively two parallel wave guides, and the voltage distribution will be as shown in Fig. 6. Upon reaching the end of the insulation, the difference in phase velocities between air and the insulation will have caused a 180° difference in relative phase position of the traveling potentials which results in the distribution of Fig. 7. This distribution at the end causes proper excitation of guide 15 as shown in Fig. 8 wherein the wave mode is the desired $TE_{01}$.

Having thus described the invention, what I claim as new and desire to secure by Letters Patent is:

1. A means for coupling rectangular wave guides together for transfer of wave energy, one of said guides having an opening in one of its wider sides, the other of said guides having an end disposed adjacent said opening, a rectangular block of insulation material within the end of said last-named guide, said block having in cross-section a wide dimension corresponding to the wide side of the guide and a narrow dimension equal to half the narrow side of the guide, the length of said block being such as to produce a 180° phase shift in block conducted waves as compared to waves traveling in the guide portion adjacent said block, and a probe carried centrally of said last guide by said block, said probe extending through said opening into said first guide and being disposed therein in the direction of the electric field.

2. A means for coupling rectangular wave guides, one of said guides having an arcuate portion, said portion having a longitudinal slot in one of the wider sides thereof, the other guide having an end disposed adjacent said slot, a rectangular block of insulation material within the end of said last-named guide, said block having in cross-section a wide sectional dimension corresponding to the wide side of the guide and a narrow dimension equal to half the narrow side of the guide, the length of said block being such as to produce a 180° phase shift in waves traveling through said block relative to waves traveling in the guide portion adjacent said block, a probe carried centrally of said last guide by said block, said probe extending through said slot to said first guide and being disposed therein in the direction of the electric field, said last guide being pivotly mounted at the center of curvature of said arcuate portion whereby said probe may be positioned at different radial points in said arcuate portion.

3. In a standing wave detector wherein energy is coupled from a first rectangular guide, having an arcuate portion and a longitudinal slot in one of the wide sides of said portion, to a second rectangular guide having an end disposed adjacent said slot, said second guide being pivotly mounted at the center of curvature of said arcuate portion, a probe extending through said slot to said first guide for coupling said guides at different radial points in said arcuate portion, said probe being disposed therein in the direction of the electric field, the combination with said second guide of a rectangular block of insulation material positioned within the end of said second guide, said block having in cross-section a wide dimension corresponding to the wide side of the guide and a narrow dimension equal to half the narrow side of the guide, the length of said block being such as to produce a 180° phase shift in waves traveling through said block relative to waves traveling in the guide portion adjacent said block, said probe being carried centrally of said second guide by said block.

EDWARD M. PURCELL.

REFERENCES CITED

The following references are of record in the file of this patent:

UNITED STATES PATENTS

| Number | Name | Date |
| --- | --- | --- |
| 1,426,207 | McDuff | Aug. 15, 1922 |
| 1,979,912 | Stirling | Nov. 6, 1934 |
| 2,088,106 | Frank | July 27, 1937 |
| 2,106,713 | Bowen | Feb. 1, 1938 |
| 2,113,675 | Brown | Apr. 12, 1938 |
| 2,129,669 | Bowen | Sept. 13, 1938 |
| 2,191,271 | Carter | Feb. 20, 1940 |
| 2,203,984 | Deters | June 11, 1940 |
| 2,359,869 | Moore | Oct. 10, 1944 |
| 2,403,289 | Korman | July 2, 1946 |
| 2,404,797 | Hansen | July 30, 1946 |
| 2,407,267 | Ginzton | Sept. 10, 1946 |
| 2,433,011 | Zaleski | Dec. 23, 1947 |